United States Patent
Fornage et al.

(10) Patent No.: US 9,509,142 B2
(45) Date of Patent: Nov. 29, 2016

(54) METHOD AND APPARATUS FOR DETERMINING A CORRECTED MONITORING VOLTAGE

(71) Applicant: Enphase Energy, Inc., Petaluma, CA (US)

(72) Inventors: Martin Fornage, Petaluma, CA (US); Marv Dargatz, Auburn, CA (US)

(73) Assignee: Enphase Energy, Inc., Petaluma, CA (US)

( * ) Notice: Subject to any disclaimer, the term of this patent is extended or adjusted under 35 U.S.C. 154(b) by 0 days.

(21) Appl. No.: 14/197,087

(22) Filed: Mar. 4, 2014

(65) Prior Publication Data

US 2014/0185344 A1    Jul. 3, 2014

Related U.S. Application Data

(63) Continuation of application No. 12/701,262, filed on Feb. 5, 2010, now Pat. No. 8,666,561.

(60) Provisional application No. 61/206,891, filed on Feb. 5, 2009.

(51) Int. Cl.
   *H02M 7/44*     (2006.01)
   *H02J 3/38*     (2006.01)

(52) U.S. Cl.
   CPC ............... *H02J 3/383* (2013.01); *H02J 3/386* (2013.01); *H02M 7/44* (2013.01); *H02J 3/382* (2013.01); *Y02E 10/563* (2013.01); *Y02E 10/763* (2013.01)

(58) Field of Classification Search
   CPC .......... H02M 7/44; H02J 3/383; H02J 3/386; H02J 3/382; Y02E 10/763; Y02E 10/563
   USPC ...... 700/286, 295, 297, 298; 702/57, 61, 64; 363/55, 95; 323/371; 324/120; 361/18
   See application file for complete search history.

(56) References Cited

U.S. PATENT DOCUMENTS

| | | | | |
|---|---|---|---|---|
| 4,604,530 A | * | 8/1986 | Shibuya | H02J 9/062 307/66 |
| 5,373,433 A | * | 12/1994 | Thomas | H02M 7/49 323/361 |
| 5,784,268 A | * | 7/1998 | Steffek | H02M 7/48 307/46 |
| 5,872,710 A | * | 2/1999 | Kameyama | 363/95 |
| 6,069,469 A | * | 5/2000 | Morikawa | H02J 3/1814 323/208 |

(Continued)

OTHER PUBLICATIONS

"929-2000-IEEE Recommended Practice for Utility Interface of Photovoltaic (PV) Systems", IEEE Standards Coordinating Committee, 2000.

(Continued)

*Primary Examiner* — Charles Kasenge
(74) *Attorney, Agent, or Firm* — Moser Taboada

(57) ABSTRACT

A method and apparatus for correcting a locally measured inverter voltage. In one embodiment, the method comprises determining a voltage compensation to compensate for a voltage drop along an AC bus between an inverter and a remotely located point on the AC bus; obtaining a voltage measurement at the inverter; applying the voltage compensation to the voltage measurement to determine a corrected voltage measurement; comparing the corrected voltage measurement to a voltage requirement; and performing a corrective action at the inverter when the corrected voltage measurement does not meet the voltage requirement.

20 Claims, 4 Drawing Sheets

(56) References Cited

U.S. PATENT DOCUMENTS

| | | | |
|---|---|---|---|
| 6,104,102 A * | 8/2000 | Tsuji et al. | 307/31 |
| 6,118,676 A * | 9/2000 | Divan | H02J 3/1814 323/207 |
| 6,169,678 B1 * | 1/2001 | Kondo et al. | 363/71 |
| 6,281,485 B1 * | 8/2001 | Siri | 250/203.4 |
| 6,339,357 B1 | 1/2002 | Yamasaki et al. | |
| 6,400,212 B1 | 6/2002 | Sakurai | |
| 6,404,655 B1 * | 6/2002 | Welches | 363/41 |
| 6,452,289 B1 * | 9/2002 | Lansberry et al. | 307/25 |
| 6,563,234 B2 * | 5/2003 | Hasegawa | H02J 3/16 307/46 |
| 6,570,779 B2 * | 5/2003 | Shimazaki et al. | 363/41 |
| 6,670,793 B1 * | 12/2003 | Cornick | H02J 3/1814 323/207 |
| 6,686,718 B2 * | 2/2004 | Jadric | H02M 5/458 318/479 |
| 6,812,592 B2 * | 11/2004 | Iwata | H02J 3/1807 307/103 |
| 6,956,305 B2 * | 10/2005 | Iwata | H02J 3/1807 307/103 |
| 7,015,597 B2 * | 3/2006 | Colby et al. | 307/31 |
| 7,069,117 B2 | 6/2006 | Wilson et al. | |
| 7,138,924 B2 | 11/2006 | Curtis | |
| 7,158,393 B2 * | 1/2007 | Schneider | H02J 3/1842 363/34 |
| 7,158,395 B2 * | 1/2007 | Deng et al. | 363/95 |
| 7,304,403 B2 * | 12/2007 | Xu | H02J 3/38 307/84 |
| 7,403,404 B2 * | 7/2008 | Oka | H02P 21/0035 318/802 |
| 7,450,406 B2 * | 11/2008 | Glauser | 363/71 |
| 7,531,990 B2 | 5/2009 | Morita et al. | |
| 7,683,589 B2 | 3/2010 | Temma et al. | |
| 7,729,810 B2 | 6/2010 | Bell et al. | |
| 7,839,024 B2 * | 11/2010 | Cardinal | F03D 7/0284 307/153 |
| 7,859,871 B2 * | 12/2010 | Angerer et al. | 363/71 |
| 7,869,232 B2 * | 1/2011 | Nagata | H02P 21/0003 363/131 |
| 7,944,083 B2 | 5/2011 | Fornage et al. | |
| 7,986,122 B2 * | 7/2011 | Fornage et al. | 320/101 |
| 7,986,539 B2 * | 7/2011 | Fornage | 363/74 |
| 8,013,472 B2 * | 9/2011 | Adest et al. | 307/77 |
| 8,121,741 B2 | 2/2012 | Taft et al. | |
| 8,139,759 B2 | 3/2012 | Ichihara et al. | |
| 8,289,742 B2 * | 10/2012 | Adest et al. | 363/71 |
| 2001/0012211 A1 * | 8/2001 | Hasegawa | H02J 3/16 363/131 |
| 2002/0140294 A1 * | 10/2002 | Iwata | H02J 3/1807 307/103 |
| 2003/0067793 A1 * | 4/2003 | Shimazaki et al. | 363/97 |
| 2003/0187550 A1 | 10/2003 | Wilson et al. | |
| 2005/0002214 A1 * | 1/2005 | Deng | G05F 1/67 363/131 |
| 2005/0110646 A1 | 5/2005 | Curtis | |
| 2005/0125104 A1 | 6/2005 | Wilson et al. | |
| 2006/0195229 A1 | 8/2006 | Bell et al. | |
| 2006/0227579 A1 * | 10/2006 | Glauser | 363/71 |
| 2006/0250166 A1 | 11/2006 | Sack et al. | |
| 2006/0255762 A1 * | 11/2006 | Yun | H02M 7/538466 318/801 |
| 2007/0024240 A1 | 2/2007 | Morita et al. | |
| 2007/0135970 A1 | 6/2007 | Zhou et al. | |
| 2008/0073912 A1 | 3/2008 | Fortmann et al. | |
| 2008/0157598 A1 * | 7/2008 | Kuitani | H02J 3/1814 307/45 |
| 2008/0186009 A1 * | 8/2008 | Tsang | H02J 3/24 323/356 |
| 2009/0001942 A1 | 1/2009 | Temma et al. | |
| 2009/0055031 A1 | 2/2009 | Slota et al. | |
| 2009/0073726 A1 * | 3/2009 | Babcock | 363/20 |
| 2009/0147554 A1 * | 6/2009 | Adest et al. | 363/71 |
| 2009/0218817 A1 | 9/2009 | Cardinal et al. | |
| 2009/0281679 A1 | 11/2009 | Taft et al. | |
| 2009/0284758 A1 | 11/2009 | Kuwata | |
| 2010/0094479 A1 | 4/2010 | Keefe | |
| 2010/0127570 A1 * | 5/2010 | Hadar et al. | 307/77 |

OTHER PUBLICATIONS

"1547-2003-IEEE Standard for Interconnecting Distributed Resources with Electric Power Systems", Standards Coordinating Committee 21, pp. 1-28, Jul. 28, 2003.

Bower et al., "Performance Test Protocol for Evaluating Inverters Used in Grid-Connected Photovoltaic Systems", Ward, pp. 1-41, Oct. 2004.

UL-1741.1 "Inverters, Converters, Controllers and Interconnection System Equipment for Use With Distributed Energy Resources", downloaded from web site http://ulstandardsinfonet.ul.com/scopes/1741.html, on Jun. 11, 2008.

\* cited by examiner

METHOD AND APPARATUS FOR DETERMINING A CORRECTED MONITORING VOLTAGE

CROSS-REFERENCE TO RELATED APPLICATIONS

The present invention is a continuation of co-pending U.S. patent application Ser. No. 12/701,262, filed Feb. 5, 2010, which claims benefit of U.S. provisional patent application Ser. No. 61/206,891, filed Feb. 5, 2009. Each of the aforementioned patent applications is herein incorporated in its entirety by reference.

BACKGROUND OF THE INVENTION

Field of the Invention

Embodiments of the present disclosure generally relate to power systems and, more particularly, to a method and apparatus for determining a corrected monitoring voltage.

Description of the Related Art

Solar panels have historically been deployed in mostly remote applications, such as remote cabins in the wilderness or satellites, where commercial power was not available. Due to the high cost of installation, solar panels were not an economical choice for generating power unless no other power options were available. However, the worldwide growth of energy demand is leading to a durable increase in energy cost. In addition, it is now well established that the fossil energy reserves currently being used to generate electricity are rapidly being depleted. These growing impediments to conventional commercial power generation make solar panels a more attractive option to pursue.

Solar panels, or photovoltaic (PV) modules, convert energy from sunlight received into direct current (DC). The PV modules cannot store the electrical energy they produce, so the energy must either be dispersed to an energy storage system, such as a battery or pumped hydroelectricity storage, or dispersed by a load. One option to use the energy produced is to employ one or more inverters to convert the DC current into an alternating current (AC) and couple the AC current to the commercial power grid. The power produced by such a distributed generation (DG) system can then be sold to the commercial power company.

In order to mitigate potential safety hazards, a DG coupled to a commercial power grid must be operated in accordance with relevant regulatory requirements, such as IEEE-1547. As part of meeting the IEEE-1547 requirements, an inverter within a DG must be deactivated under certain circumstances, including line frequency or line voltage operating outside of pre-defined limits. The IEEE-1547 standard specifies that such voltage requirements must be met at a Point of Common Coupling (PCC) between the commercial power system and the DG (i.e., a point of demarcation between the public utility service and the DG).

For installations where an inverter within a DG is located a significant distance from the PCC, an output voltage measured at the inverter may be higher than a voltage measured at the PCC due a voltage drop along the line from the inverter to the PCC. In some circumstances, the measured voltage at the inverter may exceed the required voltage range although the voltage at the PCC remains within the required range, resulting in the inverter unnecessarily shutting down and thereby reducing energy production. Additionally, as the inverter ceases power production and the voltage at the inverter is reduced to acceptable levels, the inverter once again activates and begins producing power, resulting in a continued oscillation that negatively impacts power production.

Therefore, there is a need for a method and apparatus for correcting a monitoring voltage measured at an inverter.

SUMMARY OF THE INVENTION

Method and apparatus for correcting a locally measured inverter voltage substantially as shown and/or described in connection with at least one of the figures, as set forth more completely in the claims.

Various advantages, aspects and novel features of the present disclosure, as well as details of an illustrated embodiment thereof, will be more fully understood from the following description and drawings.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
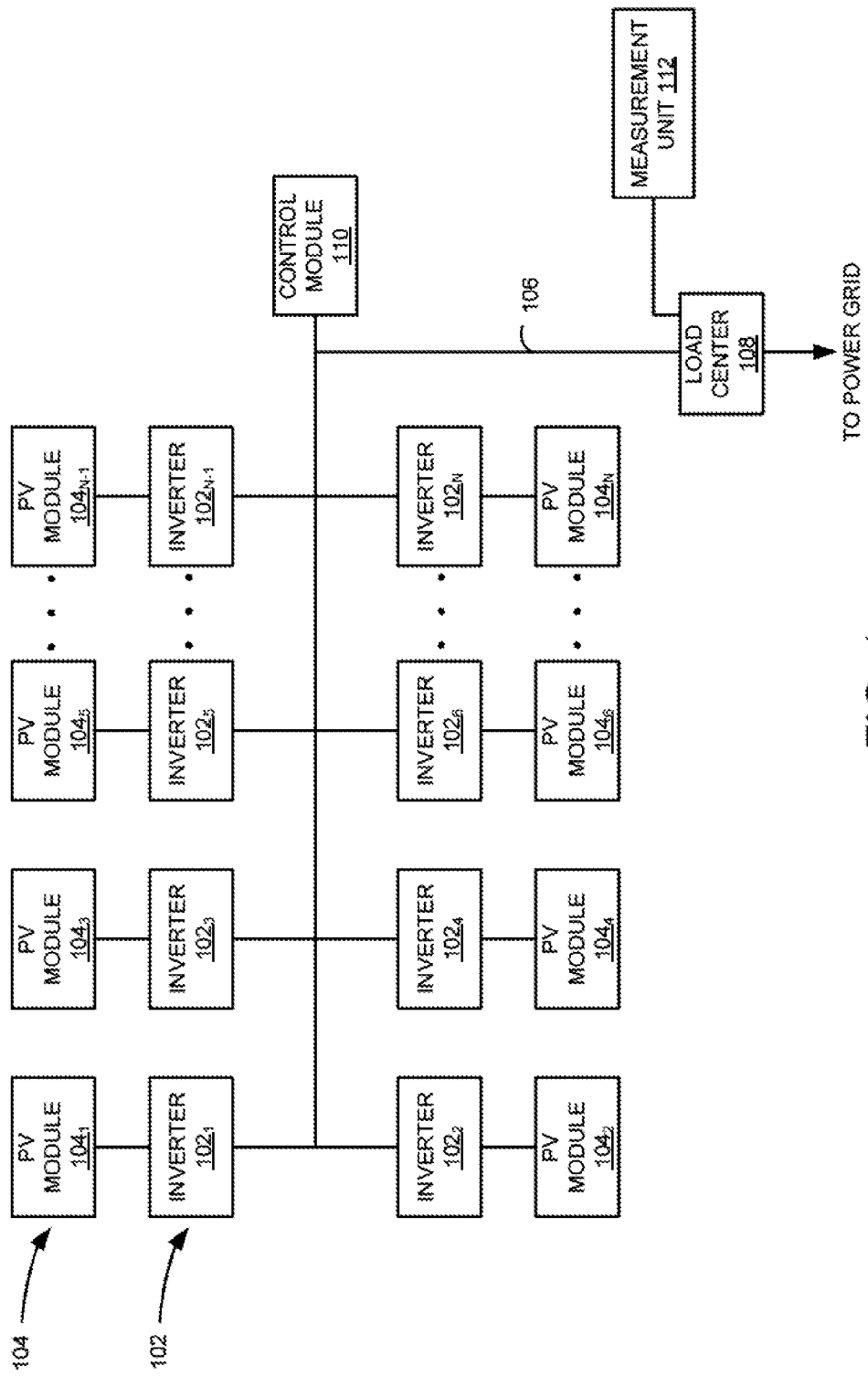
FIG. 1 is a block diagram of a system for distributed generation (DG) in accordance with one or more embodiments of the present invention.

FIG. 1 is a block diagram of a system 100 for distributed generation (DG) in accordance with one or more embodiments of the present invention. This diagram only portrays one variation of the myriad of possible system configurations. The present invention can function in a variety of distributed power generation environments and systems.

The system 100 comprises a plurality of inverters $102_1$, $102_2$ ... $102_n$, collectively referred to as inverters 102, a plurality of PV modules $104_1$, $104_2$ ... $104_n$, collectively referred to as PV modules 104, an AC bus 106, and a load center 108.

Each inverter $102_1$, $102_2$ ... $102_n$ is coupled to a PV module $104_1$, $104_2$ ... $104_n$, respectively. In some embodiments, a DC-DC converter may be coupled between each PV module 104 and each inverter 102 (e.g., one converter per PV module 104). Alternatively, multiple PV modules 104 may be coupled to a single inverter 102 (i.e., a centralized inverter); in some such embodiments, a DC-DC converter may be coupled between the PV modules 104 and the centralized inverter.

The inverters 102 are coupled to the AC bus 106, which in turn is coupled to the load center 108. The load center 108 houses connections between incoming power lines from a commercial power grid distribution system and the AC bus 106, and represents a Point of Common Coupling (PCC)

between the system 100 and the commercial power grid. The inverters 102 convert DC power generated by the PV modules 104 into AC power, and meter out AC current that is in-phase with the AC commercial power grid voltage. The system 100 couples the generated AC power to the commercial power grid via the load center 108. Additionally or alternatively, the generated power may be coupled to appliances, and/or energy generated may be stored for later use; for example, the generated energy may be stored utilizing batteries, heated water, hydro pumping, $H_2O$-to-hydrogen conversion, or the like. In some alternative embodiments, the system 100 may comprise other types of renewable energy generators in addition to or in place of the inverters 102, such as wind turbines, hydroelectric systems, or the like.

The system 100 further comprises a control module 110 coupled to the AC bus 106. The control module 110 is capable of issuing command and control signals to the inverters 102 in order to control the functionality of the inverters 102.

In accordance with one or more embodiments of the present invention, each of the inverters 102 applies voltage compensation to locally measured voltages (i.e., voltages measured at the inverter 102) when determining a monitored voltage for comparison to relevant voltage regulatory requirements. Such voltage compensation corrects for a voltage drop that occurs along the AC bus 106 between the inverters 102 and the PCC and allows the inverters 102 to determine monitoring voltage levels with respect to the PCC (i.e., corrected monitoring voltage levels) for ensuring compliance with the relevant voltage regulatory requirements. In the event that a corrected monitoring voltage exceeds required limits, the corresponding inverter 102 may be deactivated or, alternatively, AC voltage regulation may be performed.

In some embodiments, the control module 110 may receive one or more voltage samples (i.e., measurements) indicating a voltage proximate (i.e., at or near) the PCC. The control module 110 may then broadcast these PCC voltage samples $V_{pcc}$, to one or more inverters 102 for determining the corresponding corrected monitoring voltage as described further below. The PCC voltage samples $V_{pcc}$ may be obtained by a measurement unit 112 deployed at or near the load center 108; in some embodiments, the measurement unit 112 and the control module 110 may be a single integrated unit. The measurement unit 112 may sample the voltage proximate the PCC, for example, utilizing an analog to digital (ND) converter, and communicate the PCC voltage samples $V_{pcc}$, to the control module 110 for broadcast to the inverters 102. The measurement unit 112 may convert the voltage samples to a root mean square (RMS) value prior to transmission to the controller 110; alternatively, the controller 110 or the inverters 102 may perform such conversion. One example of such a measurement unit may be found in commonly assigned U.S. patent application Ser. No. 12/657, 447 entitled "Method and Apparatus for Characterizing a Circuit Coupled to an AC Line" and filed Jan. 21, 2010, which is herein incorporated in its entirety by reference.

In some embodiments, the measurement unit 112 may communicate the PCC voltage samples $V_{pcc}$, to the control module 110 utilizing power line communication (PLC), and the control module 110 may then broadcast the PCC voltage samples $V_{pcc}$ to the inverters 102 utilizing PLC; alternatively, other wired and/or wireless communication techniques may be utilized. In one or more alternative embodiments, the PCC voltage samples $V_3$ may be obtained by the measurement unit 112 and communicated directly (i.e., without the use of the controller 110) to one or more inverters 102 utilizing any of the communications techniques previously mentioned.

In some alternative embodiments, the control module 110 may determine the corrected monitoring voltage for one of more of the inverters 102, determine whether each corrected monitoring voltage is within required limits, and/or initiate deactivation of one or more inverters 102 for which the corrected monitoring voltage levels exceed required limits.

Figure 2:
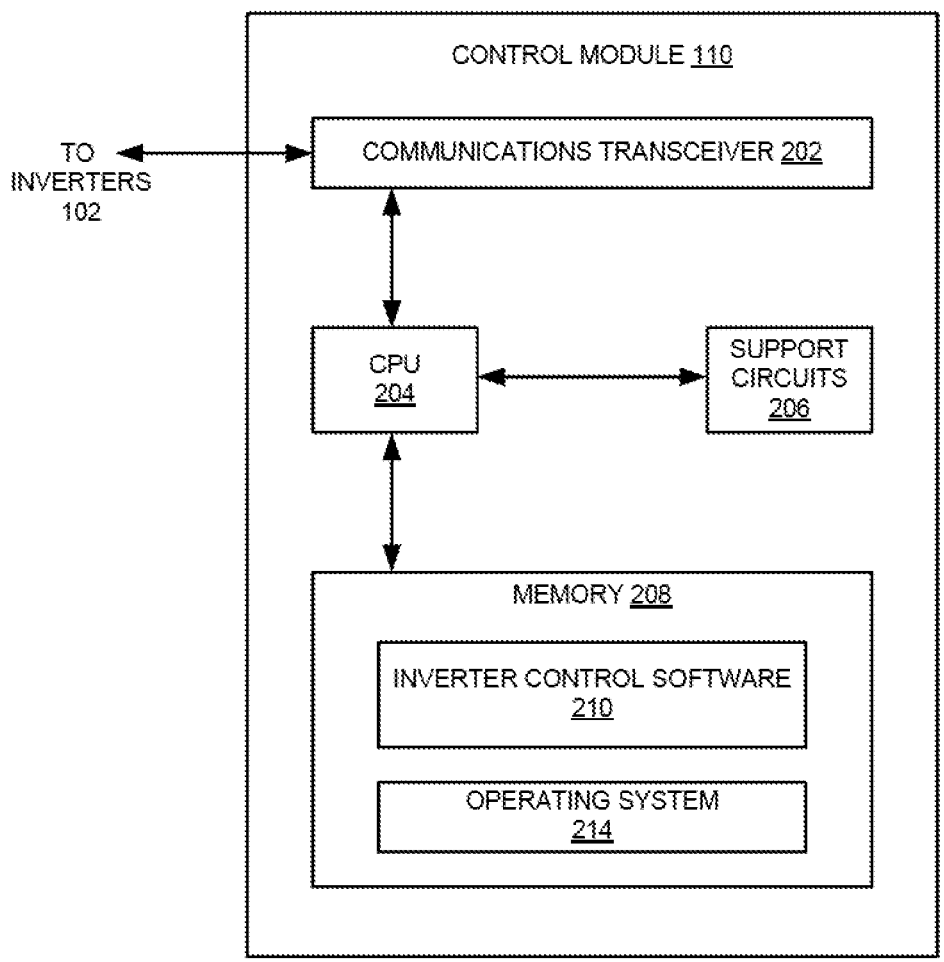
FIG. 2 is a block diagram of a control module in accordance with one or more embodiments of the present invention.

FIG. 2 is a block diagram of a control module 110 in accordance with one or more embodiments of the present invention. The control module 110 comprises a communications transceiver 202 coupled to at least one central processing unit (CPU) 204. The CPU 204 is additionally coupled to support circuits 206, and a memory 208. The CPU 204 may comprise one or more conventionally available microprocessors. Alternatively, the CPU 204 may include one or more application specific integrated circuits (ASIC). The support circuits 206 are well known circuits used to promote functionality of the central processing unit. Such circuits include, but are not limited to, a cache, power supplies, clock circuits, buses, network cards, input/output (I/O) circuits, and the like.

The memory 208 may comprise random access memory, read only memory, removable disk memory, flash memory, and various combinations of these types of memory. The memory 208 is sometimes referred to as main memory and may, in part, be used as cache memory or buffer memory. The memory 208 generally stores the operating system 214 of the control module 110. The operating system 214 may be one of a number of commercially available operating systems such as, but not limited to, SOLARIS from SUN Microsystems, Inc., AIX from IBM Inc., HP-UX from Hewlett Packard Corporation, LINUX from Red Hat Software, Windows 2000 from Microsoft Corporation, and the like.

The memory 208 may store various forms of application software, such as inverter control software 210 for operably controlling the inverters 102. The communications transceiver 202 communicably couples the control module 110 to the inverters 102 to facilitate command and control of the inverters 102. The communications transceiver 202 may utilize wireless or wired communication techniques for such communication.

Figure 3:
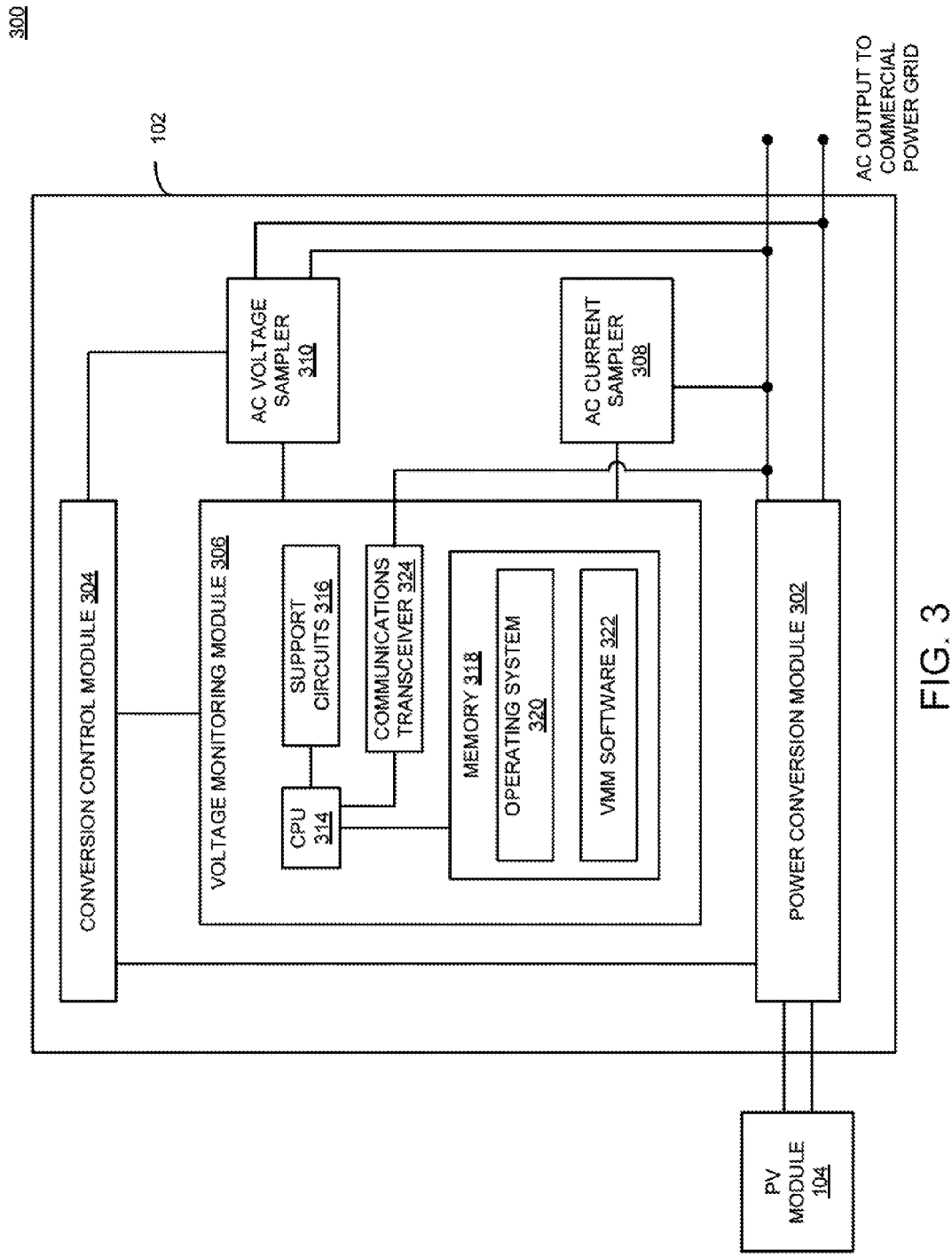
FIG. 3 is a block diagram of an inverter in accordance with one or more embodiments of the present invention.

FIG. 3 is a block diagram of an inverter 102 in accordance with one or more embodiments of the present invention. The inverter 102 comprises a power conversion module 302, a conversion control module 304, a voltage monitoring module 306, an AC current sampler 308, and an AC voltage sampler 310.

The power conversion module 302 is coupled to the PV module 104 and acts to convert DC current from the PV module 104 to AC output current. The conversion control module 304 is coupled to the AC voltage sampler 310 for receiving an AC voltage reference signal from the commercial power grid, and to the power conversion module 302 for providing operative control and driving the power conversion module 302 to inject the generated AC output current in phase with the grid as required by the relevant standards.

The voltage monitoring module 306 is coupled to the conversion control module 304, the AC current sampler 308, and the AC voltage sampler 310. The AC current sampler 308 is coupled to an output terminal of the power conversion module 302, and the AC voltage sampler 310 is coupled across both output terminals of the power conversion module 302. The AC current sampler 308 and the AC voltage sampler 310 obtain samples (i.e., measurements) of the AC inverter current and AC inverter voltage, respectively, at the output of the power conversion module 302 and provide such inverter output current and voltage samples to the voltage monitoring module 306. The AC current sampler 308 and the AC voltage sampler 310 may each comprise an A/D converter for obtaining the inverter output current and voltage samples, respectively. In some other embodiments, rather than being directly measured, the inverter output current may be estimated based on DC input voltage and current to the inverter 102 and the AC voltage output from the inverter 102.

The voltage monitoring module 306 may be comprised of hardware, software, or a combination thereof, and comprises at least one CPU 314 coupled to support circuits 316, memory 318, and a communications transceiver 324. The communications transceiver 324 is further coupled to at least one of the output lines from the power conversion module 302 for communicating via PLC, for example, with the control module 110 and/or the measurement unit 112. In alternative embodiments, the communications transceiver 324 may utilize wireless and/or other wired communications techniques for such communication.

The CPU 314 may comprise one or more conventionally available microprocessors. Alternatively, the CPU 314 may include one or more application specific integrated circuits (ASIC). The support circuits 316 are well known circuits used to promote functionality of the central processing unit. Such circuits include, but are not limited to, a cache, power supplies, clock circuits, buses, network cards, input/output (I/O) circuits, and the like.

The memory 318 may comprise random access memory, read only memory, removable disk memory, flash memory, and various combinations of these types of memory. The memory 318 is sometimes referred to as main memory and may, in part, be used as cache memory or buffer memory. The memory 318 generally stores the operating system (OS) 320 of the voltage monitoring module 306. The OS 320 may be one of a number of commercially available OSs such as, but not limited to, Linux, Real-Time Operating System (RTOS), and the like.

The memory 318 may store various forms of application software, such as voltage monitoring module (VMM) software 322 for determining a corrected monitoring voltage corresponding to the inverter 102.

To determine the corrected monitoring voltage, the voltage monitoring module 306 determines a correction coefficient $K_v$ based on an inverter output voltage sample (i.e., a measurement of the inverter output voltage) received from the AC voltage sampler 310, and a PCC voltage sample that indicates a measurement of a voltage proximate the PCC. In some embodiments, the PCC voltage sample is an RMS value obtained by the measurement unit 112 and communicated from the control module 110 as previously described. The voltage monitoring module 306 determines the correction coefficient, $K_v$, as follows:

$$K_v = V_{pcc}/V_{meas} \qquad (i)$$

where $V_{pcc}$ is the PCC voltage sample and $V_{meas}$ is the inverter output voltage sample.

Additionally, when $K_v$ is computed, the voltage monitoring module 306 computes an output power of the inverter, $P_{meas}$. In some embodiments, the voltage monitoring module 306 utilizes the inverter output voltage sample $V_{meas}$ and an inverter output current sample received from the AC current sampler 308, as well as phase angle, to determine the output power of the inverter, $P_{meas}$. Alternatively, the voltage monitoring module 306 may calculate $P_{meas}$ based on DC voltage and DC current pertaining to the inverter 102 (for example, DC voltage and DC current samples obtained by the conversion control module 304) and a conversion efficiency of the inverter 102.

In some embodiments, the inverter 102 is pre-set with an initial $K_v=1$ and determines a new $K_v$ upon receiving a valid $V_{pcc}$ measurement message. Such a message may be validated utilizing conventional communication techniques, such as addressing and checksums (e.g., cyclic redundancy check, or CRC). If the new $K_v$ is within an acceptable correction coefficient range, the voltage monitoring module 306 utilizes the new $K_v$ to determine a corrected monitoring voltage; if the new $K_v$ is not within the acceptable correction coefficient range, $K_v$ remains at its pre-set value until a next $V_{pcc}$ is obtained. In some embodiments, the acceptable correction coefficient range is $0.95 < K_v < 1.05$.

The voltage monitoring module 306 utilizes $K_v$ for computing the corrected monitoring voltage $V_{corr}$ upon obtaining inverter output current and voltage samples $I_{inv}$ and $V_{inv}$, respectively (e.g., inverter output current and voltage samples obtained subsequent to the samples utilized to compute $K_v$). The voltage monitoring module 306 determines the corrected monitoring voltage $V_{corr}$ as follows:

$$V_{corr} = V_{inv} * (1 - ((P_{inv} * (1 - K_v))/P_{meas})) \qquad (ii)$$

where $K_v$ is the correction coefficient, $V_{inv}$ and $P_{inv}$ are the inverter output voltage and power, respectively, and $P_{meas}$ is the inverter output power determined at the time $K_v$ was computed. $P_{inv}$ is computed based on inverter output current and voltage samples obtained by the AC current sampler 308 and the AC voltage sampler 310, respectively.

The voltage monitoring module 306 periodically computes $V_{corr}$ based on one or more of an updated inverter output power measurement $P_{inv}$, an updated inverter output voltage measurement $V_{inv}$, or an updated $K_v$ (e.g., $K_v$ may be updated upon receiving a new valid $V_{PCC}$ measurement message). In some embodiments, $V_{corr}$ as well as all corresponding voltage, current, power, and control parameters are determined at least once every line cycle (e.g., every 16.6667 milliseconds). If a new valid $V_{pcc}$ measurement message is not received within an aging time window, $K_v$ is reset to "1" until a valid $V_{pcc}$ message is received. In some embodiments, a linear aging function may be utilized; alternatively, a nonlinear aging function, or a combination of a linear and a nonlinear aging functions may be utilized.

In the event that the inverter output power $P_{inv}$ moves outside of a valid output power range for the current $K_v$, $K_v$ is reset to "1" until a new valid $V_{pcc}$ measurement message is received and a new $K_v$ determined. The valid output power range may be some percentage of the rated total inverter power, for example, within the range of 5% to 20% of the inverter power rating. In some embodiments, $K_v$ may be reset to "1" in the event that the inverter output power $P_{inv}$ exceeds a maximum power deviation.

The corrected monitoring voltage $V_{corr}$ provides a more accurate estimate of the voltage at the PCC than the inverter output voltage alone for determining compliance with regulatory requirements pertaining to voltage levels at the PCC. In some embodiments, the voltage monitoring module 306 determines whether the corrected monitoring voltage $V_{corr}$ is within a required voltage range with respect to the regulatory requirements; in the event the corrected monitoring voltage $V_{corr}$ exceeds the required voltage range, the voltage monitoring module 306 provides a deactivation signal to the conversion control module 304 to deactivate the power conversion module 302 or, alternatively, AC voltage regulation may be performed. In some alternative embodiments, one or more of determining the corrected monitoring voltage $V_{corr}$, determining compliance with regulatory requirements, and/or deactivation of one or more inverters as a result of one or more corrected monitoring voltage levels exceeding a required voltage range may be performed by the control module 110.

Figure 4:
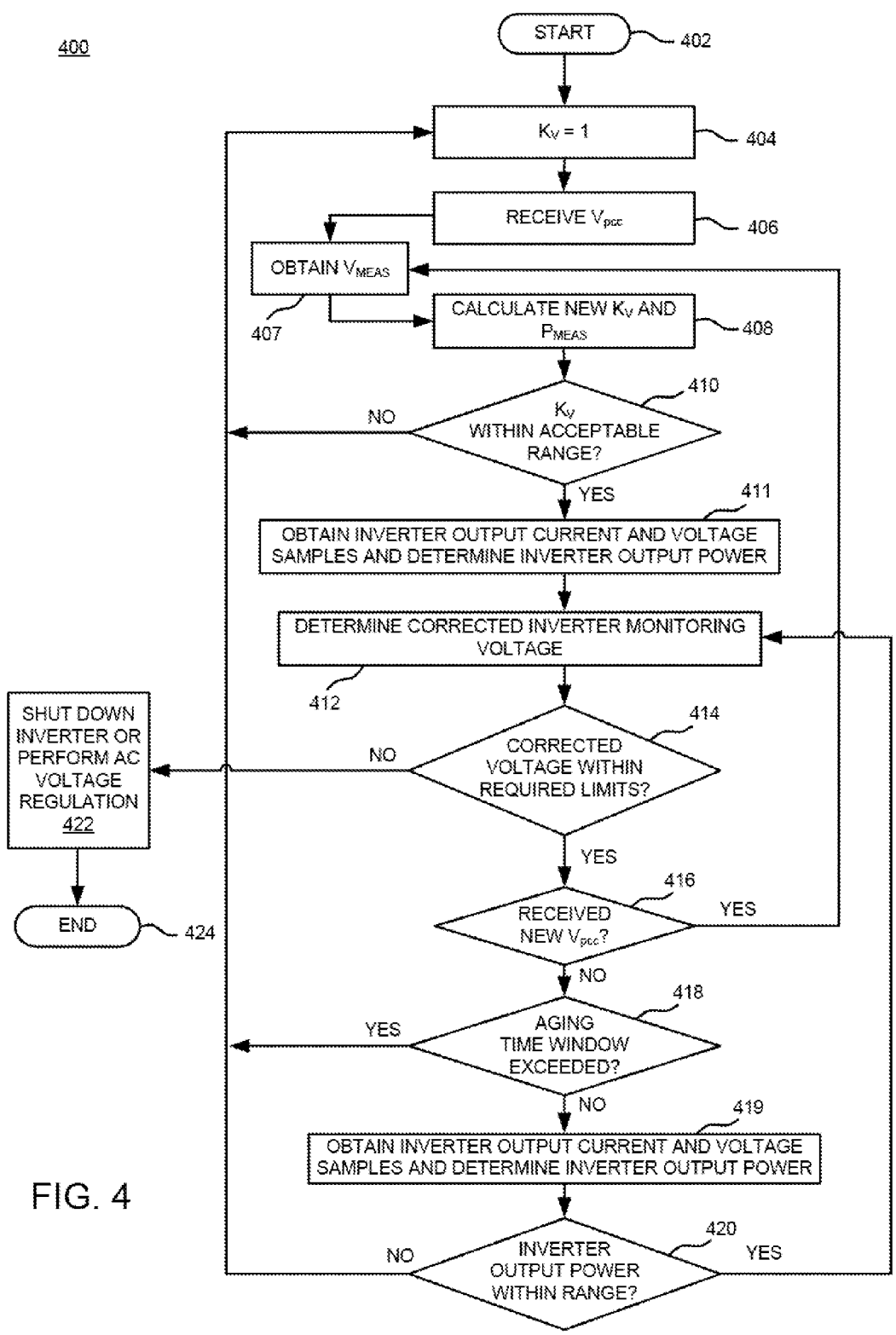
FIG. 4 is a flow diagram of a method for determining a corrected monitoring voltage in accordance with one or more embodiments of the present invention.

FIG. 4 is a flow diagram of a method 400 for determining a corrected monitoring voltage in accordance with one or more embodiments of the present invention. In some embodiments, such as the embodiment described below, AC current from a DG system comprising at least one DC-AC inverter is coupled to a commercial power grid at a PCC. Although the embodiment below is described with respect to a single inverter, each inverter of the DG system may utilize the method 400. In alternative embodiments, a controller for the DG system may utilize the method 400 for determining one or more corrected monitoring voltages and/or driving the corresponding inverters accordingly.

The method 400 begins at step 402 and proceeds to step 404. At step 404, a correction coefficient $K_v$ of an inverter has an initial value of "1". In some embodiments, the inverter may be preset with $K_v=1$, for example, at a factory during manufacturing. The method 400 proceeds to step 406, where a voltage sample (i.e., measurement) indicating a voltage proximate the PCC ("$V_{pcc}$"), is obtained. The PCC voltage sample $V_{pcc}$ may be received by the inverter as part of a validated message transmitted to the inverter; for example, the message may be broadcasted from a control module coupled to the DG system and validated utilizing conventional communication techniques, such as addressing and checksums (e.g., cyclic redundancy check, or CRC). In some embodiments, a data logger (e.g., the measurement unit 112 previously described) may be coupled proximate the PCC, for example, at a load center coupling the DG system to the commercial power grid. The data logger may sample (i.e., measure) the voltage proximate the PCC, convert the voltage sample to an RMS value, and communicate the resulting PCC voltage sample $V_{pcc}$ to the controller for broadcast to the one or more inverters of the DG system. In some alternative embodiments, the PCC voltage sample $V_{pcc}$ may be converted to an RMS value at the controller or the inverter. In some other alternative embodiments, the data logger may directly communicate the PCC voltage sample $V_{pcc}$ to the inverters utilizing wireless and/or wired communications techniques.

The method 400 proceeds to step 407, where a voltage sample of an AC output voltage of the inverter ($V_{meas}$) is obtained, for example, by an AC voltage sampler of the inverter. At step 408, a new $K_v$ is determined as follows:

$$K_v = V_{pcc}/V_{meas} \tag{iii}$$

Additionally, at the time $K_v$ is computed, an output power of the inverter ($P_{meas}$) is determined based on $V_{meas}$ and a sample of the AC output current from the inverter obtained, for example, by an AC current sampler of the inverter.

At step 410, a determination is made whether $K_v$ is within an acceptable correction coefficient range; in some embodiments, the acceptable correction coefficient range is $0.95 < K_v < 1.05$. If it is determined that $K_v$ is not within the acceptable correction coefficient range, the method 400 returns to step 404. If it is determined that $K_v$ is within the acceptable correction coefficient range, the method 400 proceeds to step 411.

At step 411, inverter output current and voltage samples are obtained ($V_{inv}$ and $I_{inv}$, respectively) and utilized to determine the inverter output power ($P_{inv}$). At step 412, a corrected monitoring voltage is determined as follows:

$$V_{corr} = V_{inv}*(1-((P_{inv}*(1-K_v))/P_{meas})) \tag{iv}$$

At step 414, a determination is made whether the corrected monitoring voltage is within required regulatory limits. In some embodiments, the inverter may compare the corrected monitoring voltage to the regulatory limits to make the determination; alternatively, the corrected monitoring voltage may be communicated, for example to the controller or the measurement unit, for determining compliance with the regulatory limits. If the result of such determination is no, the method 400 proceeds to step 422, where the inverter is deactivated; alternatively, AC voltage regulation may be performed. In some embodiments where the inverter is deactivated, upon determining that the corrected monitoring voltage exceeds required limits, the inverter may cease power production; alternatively, the inverter may receive a control signal from the controller or the measurement unit causing the inverter to cease power product. The method 400 then proceeds to step 424 where it ends. If the result of the determination at step 414 is yes, the method 400 proceeds to step 416.

At step 416, a determination is made whether a new valid $V_{pcc}$ measurement message has been received. In some embodiments, $V_{pcc}$ may be determined and communicated to the inverter at least once every line cycle (e.g., every 16.6667 milliseconds). If a new valid $V_{pcc}$ measurement message has been received, the method 400 returns to step 407. If a new valid $V_{pcc}$ measurement has not been received, the method 400 proceeds to step 418. At step 418, a determination is made whether an aging time window for $K_v$ has been exceeded. In some embodiments, a linear aging function may be applied to $K_v$ such that $K_v$ reaches a value of 1 at the end of the aging time window; alternatively, a nonlinear aging function, or a combination of linear and nonlinear aging functions, may be utilized. If the aging time window has been exceeded, the method 400 returns to step 404. If the aging time window has not been exceeded, the method 400 proceeds to step 419.

At step 419, inverter output current and voltage samples ($V_{inv}$ and $I_{inv}$, respectively) are obtained and utilized to determine a new inverter output power $P_{inv}$. At step 420, a determination is made whether the inverter output power $P_{inv}$ is within a valid output power range for the current $K_v$. The valid output power range may be some percentage of the rated total inverter power, for example, within the range of 5% to 20% of the inverter power rating. If the inverter output power $P_{inv}$ is within the valid output power range, the method 400 returns to step 412. If the inverter output power exceeds the output power range, $K_v$ is reset to 1 and the method 400 returns to step 404.

While the foregoing is directed to embodiments of the present invention, other and further embodiments of the invention may be devised without departing from the basic scope thereof, and the scope thereof is determined by the claims that follow.

The invention claimed is:

1. A method for correcting a locally measured inverter voltage, comprising:
   determining a voltage compensation to compensate for a voltage drop that occurs along an AC bus based on the distance between an inverter and a remotely located point on the AC bus;
   obtaining a voltage measurement at the inverter;
   applying the voltage compensation to the voltage measurement to determine a corrected voltage measurement;

comparing the corrected voltage measurement to a voltage requirement; and performing a corrective action at the inverter when the corrected voltage measurement does not meet the voltage requirement.

2. The method of claim 1, wherein the corrective action is one of (i) deactivating the inverter or (ii) performing AC voltage regulation.

3. The method of claim 1, wherein the voltage compensation is determined based on an initial power from the inverter, a subsequent power from the inverter, and a correction coefficient.

4. The method of claim 3, wherein the correction coefficient is equal to a ratio of a voltage measurement obtained at the remotely located point and an initial voltage measurement at the inverter.

5. The method of claim 4, wherein the initial voltage measurement is used to determine the initial power.

6. The method of claim 1, wherein the remotely located point is a point of common coupling (PCC) between a commercial AC power grid and a distributed generator (DG) that comprises the inverter.

7. The method of claim 6, wherein the DG is a photovoltaic (PV) system.

8. An apparatus for correcting a locally measured inverter voltage, comprising:
a voltage monitoring module comprising a central processing unit for:
determining a voltage compensation to compensate for a voltage drop that occurs along an AC bus based on the distance between an inverter and a remotely located point on the AC bus;
obtaining a voltage measurement at the inverter;
applying the voltage compensation to the voltage measurement to determine a corrected voltage measurement;
comparing the corrected voltage measurement to a voltage requirement; and
performing a corrective action at the inverter when the corrected voltage measurement does not meet the voltage requirement.

9. The apparatus of claim 8, wherein the corrective action is one of (i) deactivating the inverter or (ii) performing AC voltage regulation.

10. The apparatus of claim 8, wherein the voltage compensation is determined based on an initial power from the inverter, a subsequent power from the inverter, and a correction coefficient.

11. The apparatus of claim 10, wherein the correction coefficient is equal to a ratio of a voltage measurement obtained at the remotely located point and an initial voltage measurement at the inverter.

12. The apparatus of claim 11, wherein the initial voltage measurement is used to determine the initial power.

13. The apparatus of claim 8, wherein the remotely located point is a point of common coupling (PCC) between a commercial AC power grid and a distributed generator (DG) that comprises the inverter.

14. The apparatus of claim 13, wherein the DG is a photovoltaic (PV) system.

15. A system for correcting a locally measured inverter voltage, comprising:
a plurality of photovoltaic (PV) modules; and
a plurality of inverters coupled to the plurality of PV modules in a one-to-one correspondence, wherein each inverter of the plurality of inverters (i) determines a voltage compensation to compensate for a voltage drop along an AC bus between the inverter and a remotely located point on the AC bus; (ii) obtains a local voltage measurement; (iii) applies the voltage compensation to the local voltage measurement to determine a corrected voltage measurement; (iv) compares the corrected voltage measurement to a voltage requirement; and (v) performs a corrective action when the corrected voltage measurement does not meet the voltage requirement.

16. The system of claim 15, wherein the corrective action is one of (i) deactivating the inverter or (ii) performing AC voltage regulation.

17. The system of claim 15, wherein the voltage compensation is determined based on an initial power from the inverter, a subsequent power from the inverter, and a correction coefficient.

18. The system of claim 17, wherein the correction coefficient is equal to a ratio of a voltage measurement obtained at the remotely located point and an initial voltage measurement at the inverter.

19. The system of claim 18, wherein the initial voltage measurement is used to determine the initial power.

20. The system of claim 18, wherein the remotely located point is a point of common coupling (PCC) between a commercial AC power grid and a distributed generator (DG) that comprises the plurality of PV modules and the plurality of inverters.

* * * * *